United States Patent [19]

Brown

[11] Patent Number: 5,681,867

[45] Date of Patent: Oct. 28, 1997

[54] LOW-DENSITY RRIM HAVING IMPROVED COEFFICIENT OF LINEAR THERMAL EXPANSION AND HEAT DEFLECTION PROPERTIES

[75] Inventor: Bari W. Brown, Trenton, Mich.

[73] Assignee: BASF Corporation, Southfield, Mich.

[21] Appl. No.: 674,808

[22] Filed: Jul. 3, 1996

[51] Int. Cl.[6] ................................................. C08G 18/32
[52] U.S. Cl. ........................... 521/122; 521/76; 521/123; 521/174
[58] Field of Search ....................... 521/122, 123, 521/76, 174

[56] References Cited

U.S. PATENT DOCUMENTS

| | | | |
|---|---|---|---|
| 4,226,944 | 10/1980 | Stone | 522/76 |
| 4,582,887 | 4/1986 | Dominguez | 528/48 |
| 4,758,604 | 7/1988 | Barron | 521/125 |
| 4,800,103 | 1/1989 | Jeffs | 427/221 |
| 4,871,789 | 10/1989 | Martinez | 523/220 |
| 4,938,825 | 7/1990 | McDonald | 523/220 |
| 4,943,603 | 7/1990 | Martinez | 523/220 |
| 4,999,383 | 3/1991 | Blount | 521/103 |
| 5,036,118 | 7/1991 | Martinez et al. | 523/212 |
| 5,071,615 | 12/1991 | Fukami et al. | 264/257 |
| 5,077,330 | 12/1991 | Ehrhart et al. | 524/134 |
| 5,096,644 | 3/1992 | Endo | 264/137 |
| 5,208,269 | 5/1993 | Brown . | |
| 5,240,969 | 8/1993 | Brown . | |

FOREIGN PATENT DOCUMENTS

| | | |
|---|---|---|
| 0464886 A2 | 1/1992 | European Pat. Off. . |
| 2083484 | 3/1982 | United Kingdom . |

*Primary Examiner*—Morton Foelak
*Attorney, Agent, or Firm*—Harness, Dickey & Pierce, PLC

[57] ABSTRACT

The invention pertains to a low weight, low density rigid polyurethane-polyurea reinforced reaction injection molded (RRIM) part having flaked glass reinforcing fibers dispersed throughout a matrix made by reacting polyisocyanates with a resin containing hydroxy group tertiary amine polyether polyols, a blowing agent, and optionally surfactants, chain extenders, and urethane promoting catalysts. The low density RRIM part using flaked glass and the tertiary amine polyether polyols is a low cost alternative to glass fiber reinforced low density parts and the part exhibits a relatively low coefficient of linear thermal expansion and relatively/ high temperature deflection properties as compared to other known fillers.

9 Claims, No Drawings

LOW-DENSITY RRIM HAVING IMPROVED COEFFICIENT OF LINEAR THERMAL EXPANSION AND HEAT DEFLECTION PROPERTIES

FIELD OF THE INVENTION

The subject invention relates to the field of reinforced reaction injection moldings. More particularly, the subject invention pertains to reactive systems containing hydroxyl functional tertiary amine polyols as the matrix for filled fiber-reinforced water-blown moldings having an improved coefficient of linear thermal expansion and heat deflection properties as determined by fractional factorial design experiment methods.

BACKGROUND OF THE INVENTION

Reaction-injection-molding (RIM) systems have become increasingly important for the production of many commercially useful products such as automobile fascias. However, many of the reactive systems employed to date contain extensive polyurethane-polyurea linkage which have relatively low heat distortion temperatures and lack the flexural modulus and tensile strength necessary for many applications. The chemistry of these reactive systems involves the use of a polyisocyanate "A side" and a "B side" employing a mixture of compounds containing isocyanate-reactive hydrogens. These "B side" components generally include one or more hydroxyl-functional polyether or polyester polyols and one or more sterically hindered diamines. The polyol components react with the isocyanate to form urethane linkages while the amine components react to form urea linkages. Such systems are disclosed, for example, in Weber U.S. Pat. No. 4,218,543.

To improve the flex modulus and tensile strength of RIM parts, woven or non-woven fiber reinforcement glass mats have been used. Such mats are cut into the shape of the molding and laid up on a mold surface. The handling of such mats is often difficult and irritating to the skin, and requires time to cut and lay into the mold.

Other methods of improving the flexural modulus and tensile strength of RIM parts is to mix short, chopped fibers into the resin B side component and inject the fiber-containing resin with isocyanate into the mold (RRIM). This process is also well known and has been proposed as a means for the manufacture of high density parts requiring strength in applications such as exterior automotive body parts. Various types of fillers, such as mica, glass, and wollastonite have been proposed as reinforcing agents in high density RRIM. For example, U.S. Pat. Nos. 5,036,118; 4,943,603; and 4,871,789 describe the use of mica or wollastonite as reinforcement predominately in high density (>1.0 specific gravity) RRIM systems suitable for use in exterior body panels.

More recently, the use of RRIM for interior automotive parts has been investigated. In the wake of ever increasing standards for increasing fuel efficiency, the industry is continuously seeking means to reduce the weight of automotive parts while maintaining its necessary functional strength. Accordingly, for interior body parts where flexural modulus, tensile strength, and impact resistance requirements are not as stringent as in exterior body panels, low density RRIM parts have been investigated as alternatives to heavier weight metal, wood fiber, ABS and PP interior parts.

As part of the subject invention, the inventor has discovered that when combined with a particular matrix resin, milled glass flakes, alone or in combination with other reinforcement material, is an excellent alternative for glass fiber reinforcement in low density RRIM. It has also been found that by using hydroxyl functional tertiary amine polyether polyols, one can produce a RRIM part having good flexural modulus, tensile strength, and impact resistance. Such a polyol also reduces the demold time and, in at least one embodiment, reduces the viscosity of the resin for greater ease in processing, does not require the use of chain extenders/crosslinkers, and requires reduced amounts of urethane forming catalysts.

Still further, it has been discovered by the inventor through the use of fractional factorial design experiment methods that the use of certain fillers in association with hydroxyl functional tertiary amine polyether polyols, surprisingly give rise to RRIM products having both a low coefficient of linear thermal expansion and high heat deflection temperatures as compared to other similar systems. By controlling the amount, type and orientation of the filler or mixture of fillers employed, as well as the composite density, component ratio (resin/isocyanate) and mold temperature, the strength and physical properties of the resulting product can be tailored to the customers needs.

The coefficient of linear thermal expansion (CLTE), the heat deflection temperature (HDT) and the dimensional stability of low density RRIM products become increasingly important as the size of RRIM products increase. For example, the CLTE becomes important due to the size and complexity of the product as it relates to established industry tolerances. The HDT becomes an important consideration due to the structural functions the part must perform, i.e. supporting other components such as radios, heater controls and glove box assemblies in dashboards formed from low density RRIM materials. It is, therefore, desirable to form low density RRIM components which have a relatively low coefficient of linear thermal expansion and high heat deflection temperature properties.

SUMMARY OF THE INVENTION

The subject invention relates to low weight, low density rigid RRIM components employing a milled flake glass filler dispersed through a matrix comprising the reaction product of an isocyanate component and a resin component containing hydroxyl group tertiary amine polyether polyols, a blowing agent and optionally, one or more compounds selected from the group consisting of urethane-promoting catalysts, chain extenders and surfactants.

The subject invention also relates to a method for determining the optimal filler type, concentration and orientation for a given component formed with low density rigid RRIM.

DETAILED DESCRIPTION OF THE PREFERRED EMBODIMENT

The present invention relates to low density RRIM reactive systems comprising a polyisocyanate "A" side and "B" side component including a mixture of compounds containing isocyanate reactive hydrogens which form a matrix throughout which a reinforcing filler including milled flake glass is dispersed. The organic polyisocyanates which may be employed for the "A" side component include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene- 1,5-diisocyanate, 1-methoxyphenyl-2,4-diisocyanate, 2,2'-, 2,4'-, and 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane 2,2'-5,5'-tetraisocyanate; and polymericpolyisocyanates such as polymethylene polyphenylene polyisocyanate. Especially useful due to their availability and properties are 4,4'-diphenylmethane diisocyanate and polymethylene polyphenylene polyisocyanate.

Crude polyisocyanates may also be used in the compositions of the present invention, such as crude diphenylmethane isocyanate obtained by the phosgenation of crude diphenylmethane diamine. The preferred or crude isocyanates are disclosed in U.S. Pat. No. 3,215,652.

Also useful are the modified polyisocyanates, examples of which include uretoniminecarbodiimide group containing polyisocyanates (German Patent No. 10 92 007), allophanate group containing polyisocyanates (British Patent No. 994,890; Belgium Patent No. 761,626), isocyanurate group containing polyisocyanates (German Patent Nos, 10 22 789, 12 22 067, 10 27 394, German Published Application Nos. 19 29 034 and 20 04 048), urethane group containing polyisocyanates (Belgium Patent No. 752,261, U.S. Pat. No. 3,394,164), biure't group containing polyisocyanates (German Patent No. 11 01 394, British Patent No. 889,050) and ester group containing polyisocyanates (British Patent Nos. 965,474, 1,072,956, U.S. Pat. No. 3,567,763, German Patent No. 12 31 688), all of which are hereby incorporated by reference.

Preferably used are the easily accessible, optionally uretonimine-carbodiimide and urethane group-containing, aromatic di- and polyisocyanates such as 2,2'-, 2,4'-, 4,4'-diphenylmethane diisocyanate (MDI), as well as any desired mixtures of these isomers, and mixtures of 2,2'-, 2,4% 4,4'-diphenylmethane diisocyanate and polyphenyl polymethylene polyisocyanates (crude MDI). Preferably used is a uretonimine-carbodiimide-modified 4,4'-MDI composition containing from 10 weight percent to 40 weight percent modified MDI and 60 weight percent to 90 weight percent 4,4'-MDI, optionally containing less than 10 weight percent 2,2'- and 2,4'-MDI, the weight percentages based on the weight of the uretoniminecarbodiimide-modified 4,4'-MDI composition. The weight ratio of uretonimine to carbodiimide ranges from 20:1 to 1:1.

Quasi-prepolymers are also preferred, such as urethane-modified MDI obtained by reacting a low molecular weight (<400) polyhydric compound with 4,4'-MDI, the final product containing, for example, from 40 weight percent to 60 weight percent urethane prepolymer and 40 weight percent to 60 weight percent 4,4'-MDI.

Other such modifications include forming a quasi-prepolymer by reacting a uretonimine-r-arbodiimide-modified, allophanate-modified, or biuret-modified MDI with a low or high molecular weight polyhydric compound.

The above-mentioned isocyanates may be used singly or as blends with other isocyanates to obtain the desired physical properties, viscosity, and freezing point. For example, crude MDI may be admixed with 4,4'-MDI and 2,4'-MDI; or one may blend the uretonimine-carbodiimide-modified MDI with a urethane-modified MDI and optionally crude MDI. Such blends may then, if desired, be reacted with a polyhydric compound to obtain a quasi-prepolymer.

The B side resin component contains a hydroxyl functional tertiary amine polyether polyol prepared by oxyalkylating an aliphatic or aromatic amine with ethylene oxide, propylene oxide, or mixtures thereof.

Examples of suitable aromatic amines which are useful as initiators include the various phenylenediamines, toluenediamines, and diphenylmethanediamines. Examples of suitable aliphatic amines include ethylenediamine, propylenediamine, 1,4-butanediamine, 1,6-hexanediamine, diethylenetriamine, triethylenetetraamine, and the like. Hydroxylalkylamines may also be useful, for example, 2-hydroxyethylamine and 2- and 3-bydroxypropylamine, bis(2-hydroxyethyl)ethylamine, tris(2-hydroxyethyl)amine and the like. The preferred initiators are monoethanolamine, ethylenediamine, 2-hydroxylpropylamine, and bis(2-hydroxyethyl)-2-hydroxypropylamine.

The amine or hydroxyalkylamine initiators are oxyalkylated with sufficient alkylene oxide to convert at least one and preferably all amino groups to tertiary amino groups. Alkylene oxides may be mentioned such as ethylene oxide and propylene oxide. Mixtures of these alkylene oxides may be used; or they or their mixtures may be used sequentially to form homopolymeric, block, heteric, or block-heteric polyether polyols. The process of preparation of such polyether polyols is conventional and is well known to those skilled in the art.

Preferred hydroxyl functional tertiary amine polyether polyols are polyoxypropylated-polyoxyethylated monoethanolamines containing a primary hydroxyl group cap, such as polyoxyethylene, from 5 weight percent to 35 weight percent, preferably from 20 weight percent to 30 weight percent. Additional preferred hydroxyl functional tertiary amine polyether polyols are polyoxypropylated-polyoxyethylated ethylenediamines capped with polyoxyethylene groups in an amount from 5 weight percent to 35 weight percent, preferably 10 weight percent to 20 weight percent. Mixtures of these two polyols are also suitable, preferably in weight ratios of the monoethanolamine initiated polyether polyol to the ethylenediamine initiated polyether polyol from 9:1 to 2:1 where no other polyol is admixed.

The B side resin component preferably contains from about 10 weight percent, more preferably 20 weight percent to 100 weight percent of hydroxyl group tertiary amine polyether polyol based on the weight of all polyether polyols in the resin. Suitable amounts of the tertiary amine polyether polyol contained in the resin component range from 10 weight percent to 99 weight percent, preferably 20 to 99 weight percent, more preferably 50 to 99 weight percent, based on the weight of all reactive compounds in the B side resin component. Reactive compounds include all ingredients except wollastonite fibers and other optional room temperature insoluble fillers and fibers. In a more preferable embodiment of the invention, all (100 weight percent) polyether polyols in the resin consist of tertiary amine polyether polyols terminated with primary hydroxyl groups; and the resin is devoid of any chain extenders or crosslinkers.

The average functionality of the hydroxyl functional tertiary amine polyether polyols is from about 2.5 to 6, preferably about 2.8 to about 4.0, with average equivalent weights being from about 50 to about 3,000. Polyols with lower functionalities and higher molecular weights tend to make the low density foam more flexible and increases its impact strength at the expense of flexural modulus. A lower molecular weight, high functionality polyol will increase the crosslinking density and the flexural modulus of the foam. It has been found that one may advantageously achieve a high flexural modulus by using high functionality polyols and maintain the impact strength of the foam by blending a low molecular weight polyol with a high molecular weight polyol. Thus, in one preferred embodiment, a low molecular weight tri-functional polyol is blended with a high molecular weight tertiary functional polyol to obtain a foam possessing good flexural modulus while maintaining a satisfactory impact strength.

One may blend in major or minor quantities polymer modified polyether polyols with the hydroxyl functional tertiary amine polyether polyols. One of such polymer modified polyether polyols is known as graft polyols. Graft polyols are well known to the art and are prepared by the in situ polymerization of one or more vinyl monomers, preferably acrylonitrile and styrene, in the presence of a polyol ether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No.4,690,956; and in U.S. Pat. No. 4,524,147; all of which patents are herein incorporated by reference. The use of graft polyols may increase the flexural modulus and tensile strength of the foam.

Non-graft polymer modified polyols are also suitable, for example, those prepared by the reaction of a polyisocyanate with an alkanolamine in the presence of a polyol as taught by U.S. Pat. Nos. 4,293,470; 4,296,213; and 4,374,209; dispersion of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 microns, preferably less than 10 microns.

Also useful in minor amounts are amine initiated polyether polyols which have free amino hydrogens and hydroxyl-functional polyoxyalkylene moieties, blended with the tertiary amine polyol. Such polyols are prepared as taught by U.S. Pat. No. 4,517,383, by oxyalkylating an aliphatic or aromatic amine with a stoichiometric excess of alkylene oxide, but utilizing an extraordinarily high amount of basic oxyalkylation catalyst which must be present at the onset of oxyalkylation. Such dual-functionality asymmetric polyols create both urethane and urea linkages in the finished product, and further have the advantage of lower viscosities than their fully oxylated, symmetrical analogues.

To promote fast demold times, it is preferable that at least one of the polyether polyols, more preferably all of the polyether polyols, be terminated with primary hydroxyl groups rather than secondary hydroxyl groups.

Hydroxyl-functional-and amine-functional chain extenders are optional and include hydroxyl-functional chain extenders such as ethylene glycol, glycerine, trimethylolpropane, 1,4-butanediol, propylene glycol, dipropylene glycol, 1,6-hexanediol, and the like; and amine-functional chain extenders such as the sterically hinder diethyltoluene diamine and the other hindered amines disclosed in Weber U.S. Pat. No. 4,218,543; phenylene diamine, 1,4-cyclohexane-bis-(methylamine), ethylenediamine, diethylenetriamine, N-(2-hydroxypropyl)-etbylenediamine, N,N'-di(2-bydroxypropyl) ethylenediamine, piperazine, and 2-methylpiperazine. In low density RRIM systems, the amount of chain extender is generally less than 30 weight percent based on the total weight of the resin component, preferably less than 25 weight percent, more preferably no chain extender being present. In resin components exclusively containing hydroxyl functional tertiary amine polyols, chain extenders are not necessary.

Plasticizers may also optionally be used in the subject invention low density RRIM systems. In low density RRIM, the amount of plasticizer is generally less than 25 weight percent of the total resin (B-side) component.

Mold releases, both external and internal, may be utilized. Internal mold releases are generally mixtures of long chain carboxylate salts, particularly ammonium and substituted ammonium stearates, and calcium and zinc stearates. External mold releases are well-known commercial products and include waxes and silicones.

In the low density RRIM systems of the invention, a blowing agent is necessary. Water is the preferred blowing agent and may be used in amounts of up to about 4 weight percent, preferably less than 1.0 weight percent, more preferably less than 0.5 weight percent, of the resin (B-side) component. The density of the foam decreases with increasing water content. When water is used as the blowing agent, the polyisocyanate component is increased proportionately. Calculating the amount of water required and isocyanate required are routinely performed by those skilled in the arts of polyurethane and polyisocyanurate foams.

Chlorofluorocarbons (CFCs) and other volatile organic compounds may also be-used as blowing agents, either alone, or in conjunction with water. When used alone, CFC blowing agents and other halogenated organics such as methylene chloride are generally used in amounts up to about 30 weight percent of the polyol component, preferably from 15 to about 25 weight percent. Other volatile organic compounds such as pentane, isopentane, acetone, and the like, are used in correspondingly lesser amounts due to their lower molecular weights. When co-blown, the CFC-type blowing agents are utilized in lesser amounts, for example, up to about 20 weight percent of the polyol component. Preferable are the HCFCs having an ozone depletion potential of 0.05 or less. Other reactive blowing agents may be used in conjunction with water, such as tertiary alcohols and formic acid.

Flame retardants may also be used when required by the formulation. Suitable flame retardants are well known to those skilled in the art; but the low molecular weight halogenated phosphate esters, polyhalogenated biphenyls, biphenyloxides, and the like may be used when flame retardants are necessary. As the presence of such flame retardants generally causes a decrease in physical properties, use of flame retardants is not preferred.

Ultraviolet stabilizers and absorbers may also be useful. Such stabilizers generally act by absorbing ultraviolet radiation. Many such ultraviolet absorbers are commercially available, such as the Uvinul® absorbers manufactured by BASF Corporation, Mt. Olive, N.J.

Suitable catalysts include both urethane and isocyanurate reaction promoting catalysts and are well known to those skilled in the art of polyurethanes. Suitable polyurethane-promoting catalysts include tertiary amines such as, for example, triethylenediamine, N-methylmorpholine, N-ethylmorpholine, diethylethanolamine, N-cocomorpholine, 1-methyl-4-dimethylamino-ethylpiperazine, 3-methoxypropyldimetbylamine, thylaminopropyldiethylamine, dimethylbenzylamine, and the like. Preferred catalysts are amine catalysts such as those commercial available from Air Products Chemical Company under the name of DABCO® 33-LV. Other suitable catalysts are, for example, stannous chloride, dibutyltin di-2-ethyl hexanoate, stannous oxide, dibutyltin diacetate, dibutyltindilaurate, as well as other organometallic compounds such as are disclosed in U.S. Pat. No. 2,846,408. Suitable amounts of urethane catalyst are I weight percent of the resin component, preferably less than 0.3 weight percent.

Isocyanurate promoting catalysts include potassium acetate and potassium 2-ethylhexanoate, with potassium acetate being advantageously mixed as a solution in a glycol such as ethylene glycol.

A surface-active agent is also optional but may be used for production of high grade polyurethane foam especially when polyols other than the tertiary amine polyols are employed. Surfactants prevent the foam from collapsing and promote fine uniform cell structures. Numerous surface-active agents have been found satisfactory. Nonionic surface-active agents are preferred. Of these, the nonionic surface-active agents such as the well-known silicones have been found particularly desirable. Other surface-active agents include polyethylene glycol ethers of long chain alcohols, tertiary amine or alkanolamine salts of long chain alkyl acid sulfate esters, alkyl sulfonic esters, and alkyl arylsulfonic acids. Preferred surfactants are DC190 and DC193, silicon-containing surfactants available from Dow Corning, Midland, Mich.

The flexural modulus, heat distortion temperature, and rigidity of the matrix may in part be adjusted by varying the urethane/isocyanurate content of the product. The isocyanurate content is increased by increasing the ratio of isocyanate (A side) to polyol (B side). In general, isocyanate indices of from 80 to about 700 are useful, preferably from 95 to about 250, and most preferably from 95 to 120.

As alluded to earlier, it has been discovered by the inventor that a relatively low coefficient of linear thermal expansion and a high heat deflection temperature can be achieved for low density RRIM products through the use of a unique filler component as determined by fractional factorial design experiment methods.

The filler component of the subject invention includes a predetermined amount of flaked glass, and optionally, one or more other fillers such as milled glass and wollastonite, among others. Under a preferred embodiment in terms of CLTE and HDT, the filler component will comprise at least 20.0 wt. %, more preferably 50.0 wt. %, and still more preferably at least 80.0 wt. % flaked glass based on the total amount of filler component employed. Generally speaking, fillers other than flaked glass should generally only be employed to reduce cost since the inclusion of filler components other than flaked glass effects a reduction in the desired CLTE and HDT values. The average diameter of the flaked glass employed as determined by screen analysis can vary from approximately 1/64 of an inch up to about 1/8 of an inch depending on the intended use of the product formed from the RRIM material.

The flakes tend to have an extremely high stiffness at low loading levels as compared to other reinforcement materials. Further, unlike micaceous materials, flaked glass generally does not delaminate under stress. The flaked glass filler employed in accordance with the teachings of the present invention may, optionally but preferably, be treated with a coating composition such as aminoalkyl, chloro, epoxy, vinyl and/or isocyanate compiling agents, latex, and titanate, among others. While any of numerous commercially available flaked glass products can be utilized, one known as FLAKEGLAS® available from NYCO Corporation has been found to be particularly useful.

Milled glass which essentially are tubular shaped fibers having an average length approximately five times greater than the width are commercially available from numerous sources including Owens Corning Fiberglass and PPG Industries, among others.

The wollastonite, if employed, preferably has an aspect ratio of greater than 2, and more preferably 10 or greater, and an average particle size ranging from 0.005 inch to 1 inch, more preferably from 0.032 to 0.25 inch, with 1/16 inch being the most preferred.

The wollastonite particles are also preferably surface treated to improve adhesion between the particle and the polymer matrix. The surface treatment employed may be a coating treatment applied to the surface of the particle as a chemical modification to the filler. Surface treating agents and methods are well known to those of skill in the art and are disclosed in U.S. Pat. Nos. 5,096,644; 4,582,887; 4,374,210; 4,444,910; 4,218,510; 4,296,945; 4,689,356; 4,585,803; and 4,800,103, as well as an article entitled *Adhesion and Bonding in Composites,* Ryutoko Yosomiya et al., Marchel Dekker, Inc., New York 1990, pp. 110–154, all of which are hereby incorporated by reference. Preferred coatings include epoxy, chloro, isocyanate, and amino silane coupling agents.

Suitable amounts of the component filler dispersed throughout the RRIM part range from 10 wt. % to 20 wt. % based on the weight of the total composition, preferably from 12 wt. % to 18 wt. %, or still more preferably from 14 wt. % to 16 wt. % based on the total weight of the component, i.e. up to 35 wt. % based on the weight of the polyol component.

Methods of manufacturing RRIM moldings are well known in the art. The resin components are mixed and maintained at tank temperatures from 75° F. to 95° F., preferably from 85° F. to 95° F. to reduce the viscosity of the resin. The isocyanate component "A" and the resin component "B" are impingement mixed at pressures around 2,000 psi and injected at about atmospheric pressure into an open mold which is subsequently shut and clamped at or about 150–200 psi into a closed mold. The mold is preheated at from 100° F. to 180° F., preferably from 130° F. to 150° F., more preferably around 140° F., and may contain a substrate such as vinyl laid up on a mold surface. The raw material is usually center injected, after which the part is demolded after a period of typically one-and-a-half to four minutes. By using the tertiary amine polyols of the present invention, especially a predominant amount of the monoethanolamine initiated tertiary amine polyol of the invention, the reaction time is much quicker, reducing the cure and demold time to 60 seconds or less.

The following examples illustrate the nature of the invention and are not intended to be limiting thereof.

Polyol A is a tertiary amine polyether polyol comprising a propylene oxide-ethylene oxide additive of ethylenediamine terminated with about 15 weight percent ethylene oxide and having a nominal hydroxyl number of 62.

Polyol B is a tertiary amine polyether polyol comprising a propylene oxide-ethylene oxide adduct of monoethanolamine terminated with about 26 weight percent ethylene oxide and containing about 55 weight percent proloxypropylene having a nominal hydroxyl number of 500.

Polycat 46 is a 62/38 weight percent blend of glycol and potassium acetate, respectively, available from Air Product Corp.

DABCO 3,3-LV is a 33/67 weight percent blend of TEDA and DP6, respectively, available from Air Products Corp.

T-12 is a dibutyltin dilaurate curing agent available from Air Products Corp.

Isocyanate A is a blend of isocyanates comprising about 60 weight percent 4,4'-diphenylmethane diisocyanate, 5 weight percent 2,4'-diphenylmethane diisocyanate, and 35 weight percent three-ringed or higher oligonscic polymethylene polyphenylene polyisocyanate.

Filler A is one-sixty fourth inch (1/64") flaked glass, commercially available from NYCO Corp under the name FLAKEGLAS®.

Filler B is one-sixteenth inch (1/16") milled glass, commercially available from Owens Corning Fiberglass.

Filler C is a wollastonite fiber, an acicular calcium metasilicate commercially available from NYCO Corp. under the name of G-RRIM Wollastokup® having a 15:1 aspect ratio.

EXPERIMENTAL

Numerous plaques made on a Cincinnati Milacron® RIM 90, and an Elastogran Maschinenbau (EMB) PU SV machine equipped with a 14 mm high pressure impingement short stroke mixhead were prepared to conduct the fractional factorial design experiments to determine which fillers offered the best values in terms of low CLTE's and high HDT's when used in the low density RRIM compositions of the present invention. Two heated molds having the following dimensions, 36"×36"×0.125" and 36"×10"×3/8", respectively, were used to obtain plaques for physical property measurement data. The clamping presses used, for molding samples were a Dake® 75 ton press available from JSJ Corporation of Grand Rapids, Mich., and a Cincinnati Milacron 90 ton press. Both molds were parting line gated with harp style aftermixers. The long mold was injected from the end. Test specimens submitted for physical property measurement were cut parallel and perpendicular to the material flow due to fiber filler orientation.

The four variables chosen to conduct the fractional factorial design experiment were mold temperature, filler loading, ratio index, and density, each variable being tested at a high and low level as set forth in Table I.

TABLE I

| VARIABLE MATRIX | | |
|---|---|---|
| | HIGH | LOW |
| Mold Temperature, deg. F. | 160–165 | 140–145 |
| Composite Density, pcf | 38–41 | 33–35 |
| Ratio Index, (isocyanate/resin) | 110 | 100 |
| Composite Filler Loading, % | 20 | 15 |

The remaining processing conditions were held constant as indicated in Table II.

TABLE II

| TYPICAL PROCESSING CONDITIONS | |
|---|---|
| Material Temperatures, deg. F. | |
| Resin | 90–95 |
| Isocyanate | 85–90 |
| Throughput, gps | 900 |

TABLE II-continued

| TYPICAL PROCESSING CONDITIONS | |
|---|---|
| Impingement Mix Pressures, psi | |
| Resin | 1500–1800 |
| Isocyanate | 1800–2100 |
| Demold Time, min. | 4 |

The experiment was conducted three different times, each time using a different filler type to determine its effect, if any, on the CLTE and HDT properties. To conduct the analysis, a standard side B resin composition was prepared by sequentially blending 63.48 parts of Polyol B; 7.0 parts of Polyol A; 0.75 parts of POLYCAT 46; 0.1 parts of DABCO 33-LV; 0.3 parts water and 0.1 parts T-12 in an amount sufficient to form the various RRIM samples tested. Separate samples of the standard were taken to which a predetermined amount (i.e. 15.0 or 20.0 parts) of one of the Fillers A, B or C was added in two stages to satisfy loading level requirements. The blends were mixed for approximately one hour, or when the filler was fully dispersed, then pumped into a resin day tank of the urethane machine. When loading level 1 of the filler for each experiment was complete, the material was drained back into the original drum from the machine, re-weighed and adjusted to level 2. Thereafter, the 100 parts of each resin sample containing a different filler was reacted with 83 parts of polyisocyanate A to form the various plaques tested. The water and catalyst level was re-adjusted to the correct the reactivity profile after each catalyst addition.

A total of eight runs were made for each filler type. Each run consisted of different combinations of the variable of mold temperature, filler loading, density, and ratio index. A total of 4 plaques were made of each run. The same eight runs were repeated for each filler type using draws from the same lot of material. A total of 96 plaques were made with 48 submitted for physical testing with the remainder retained as duplicates. All plaques for testing were allowed to cure for 48 hours before testing. Test specimens were cut using a rigid band saw blade to avoid subjecting samples to stresses caused by die cutting. Each sample plaque submitted for testing had equal numbers of specimens cut parallel and perpendicular to the material flow direction due to anticipated fiber orientation.

The results of the physical testing was analyzed using fractional factorial design experiment methods, wherein the data set forth in Table III was statistically analyzed for the mean square deviation to determine the factors that influenced HDT. The degree of magnitude for each of those influencing factors were also determined by means of absolute values. As previously noted, it is advantageous to obtain the highest value possible for HDT, especially as these properties relate to large parts such as instrument panel substrates where the part is expected to perform structural functions such as supporting radios, heater controls and glove box assemblies. Therefore, the total average for all high YBar values was calculated to include the high value for each factor tested divided by the total number of factors, (i.e. (148.0+143.75+149.5+145.5)/4=146.7° F. for HDT milled glass, parallel).

TABLE III

HDT Milled, parallel

| Factor | Level | 1 | 2 | 3 | 4 | YBar* | YBar Delta | S/N | S/N Delta |
|---|---|---|---|---|---|---|---|---|---|
| Density | 33–35 | 130 | 152 | 122 | 127 | 132.75 | −15.25 | 42.3725 | −0.9511 |
|  | 38–41 | 164 | 152 | 132 | 144 | 148.00 |  | 43.3236 |  |
| Index | 100 | 130 | 164 | 122 | 132 | 137.00 | −6.72 | 42.5780 | −0.5025 |
|  | 110 | 152 | 152 | 127 | 144 | 143.75 |  | 43.0806 |  |
| Filler | 15 | 130 | 164 | 152 | 152 | 149.50 | 18.25 | 43.3981 | 1.0845 |
|  | 20 | 122 | 132 | 127 | 144 | 131.25 |  | 42.3135 |  |
| Mold Temp | 140–145 | 130 | 152 | 132 | 127 | 135.25 | −10.25 | 42.5604 | −0.5407 |
|  | 160–165 | 164 | 152 | 122 | 144 | 145.50 |  | 43.1008 |  |

*Average of all high YBar values = 146.7° F.

HDT Milled Glass, perpendicular

| Factor | Level | 1 | 2 | 3 | 4 | YBar* | YBar Delta | S/N | S/N Delta |
|---|---|---|---|---|---|---|---|---|---|
| Density | 33–35 | 126 | 142 | 115 | 116 | 124.75 | −8.25 | 41.8291 | −0.5953 |
|  | 38–41 | 146 | 132 | 122 | 132 | 133.00 |  | 42.4245 |  |
| Index | 100 | 126 | 146 | 115 | 122 | 127.25 | −3.25 | 41.9945 | −0.2447 |
|  | 110 | 142 | 132 | 116 | 132 | 130.50 |  | 42.2422 |  |
| Filler | 15 | 126 | 146 | 142 | 132 | 136.50 | 15.25 | 42.6583 | 1.0232 |
| Mold Temp | 140–145 | 126 | 132 | 122 | 116 | 124.00 | −9.75 | 41.8395 | −0.5730 |
|  | 160–165 | 146 | 142 | 115 | 132 | 133.75 |  | 42.4125 |  |

*Average of all high YBar values = 133.4° F.

HDT Wollastonite, parallel

| Factor | Level | 1 | 2 | 3 | 4 | YBar* | YBar Delta | S/N | S/N Delta |
|---|---|---|---|---|---|---|---|---|---|
| Density | 33–35 | 135 | 156 | 138 | 128 | 139.25 |  | 42.8088 | −0.4093 |
|  | 38–41 | 150 | 155 | 134 | 143 | 145.50 |  | 43.2180 |  |
| Index | 100 | 135 | 150 | 138 | 134 | 139.25 | −6.25 | 42.8501 | −0.3228 |
|  | 110 | 156 | 155 | 128 | 143 | 145.50 |  | 43.1729 |  |
| Filler | 15 | 135 | 150 | 156 | 155 | 149.00 | 13.25 | 43.4192 | 0.7859 |
|  | 20 | 138 | 134 | 128 | 143 | 135.75 |  | 42.6333 |  |
| Mold Temp | 140–145 | 135 | 155 | 134 | 128 | 138.00 | −8.75 | 42.7323 | −0.5711 |
|  | 160–165 | 150 | 156 | 138 | 143 | 146.75 |  | 43.3034 |  |

*Average of all high YBar values = 146.7° F.

HDT Wollastonite, perpendicular

| Factor | Level | 1 | 2 | 3 | 4 | YBar* | YBar Delta | S/N | S/N Delta |
|---|---|---|---|---|---|---|---|---|---|
| Density | 33–35 | 124 | 144 | 115 | 124 | 126.75 | −9.25 | 41.9738 | −0.6463 |
|  | 38–41 | 139 | 148 | 125 | 132 | 136.00 |  | 42.6201 |  |
| Index | 100 | 124 | 139 | 115 | 125 | 125.75 | −11.25 | 41.9313 | −0.7386 |
|  | 110 | 144 | 148 | 124 | 132 | 137.00 |  | 42.6699 |  |
| Filler | 15 | 124 | 139 | 144 | 148 | 138.75 | 14.25 | 42.7845 | 0.9476 |
|  | 20 | 115 | 125 | 124 | 132 | 124.00 |  | 41.8369 |  |
| Mold Temp | 140–145 | 124 | 148 | 125 | 124 | 130.25 | −2.25 | 42.2234 | −0.1238 |
|  | 160–165 | 139 | 144 | 115 | 132 | 132.50 |  | 42.3472 |  |

*Average of all high YBar values = 136° F.

HDT Flake Glass, parallel

| Factor | Level | 1 | 2 | 3 | 4 | YBar* | YBar Delta | S/N | S/N Delta |
|---|---|---|---|---|---|---|---|---|---|
| Density | 33–35 | 159 | 165 | 140 | 128 | 148.00 | −2.75 | 43.2711 | −0.1759 |
|  | 38–41 | 165 | 163 | 131 | 144 | 150.75 |  | 43.4470 |  |
| Index | 100 | 159 | 165 | 140 | 131 | 148.75 | −1.25 | 43.3353 | −0.0459 |
|  | 110 | 165 | 163 | 128 | 144 | 150.00 |  | 43.3812 |  |
| Filler | 15 | 159 | 165 | 165 | 163 | 163.00 | 27.25 | 44.2408 | 1.6157 |
|  | 20 | 140 | 131 | 128 | 144 | 135.75 |  | 43.6350 |  |
| Mold temp | 140–145 | 159 | 163 | 131 | 128 | 145.25 | −8.25 | 43.0870 | −0.5605 |
|  | 160–165 | 165 | 165 | 140 | 144 | 153.50 |  | 43.6475 |  |

*Average of all high YBar values = 154.3° F.

HDT Flake Glass, perpendicular

| Factor | Level | 1 | 2 | 3 | 4 | YBar* | YBar Delta | S/N | S/N Delta |
|---|---|---|---|---|---|---|---|---|---|
| Density | 33–35 | 136 | 153 | 131 | 124 | 136.00 | −6.5 | 42.5945 | −0.3919 |
|  | 38–41 | 152 | 156 | 128 | 134 | 142.50 |  | 42.9865 |  |
| Index | 100 | 131 | 152 | 131 | 128 | 135.50 | −6.25 | 42.5794 | −0.3334 |
|  | 110 | 153 | 156 | 124 | 134 | 141.75 |  | 42.9129 |  |
| Filler | 15 | 136 | 152 | 153 | 156 | 149.25 | 20 | 43.4400 | 1.2222 |
|  | 20 | 131 | 128 | 124 | 134 | 129.25 |  | 42.2179 |  |

TABLE III-continued

| | | | | | | | | | |
|---|---|---|---|---|---|---|---|---|---|
| Mold Temp | 140–145 | 136 | 156 | 128 | 124 | 136.00 | −6.5 | 42.5722 | −0.4389 |
| | 160–165 | 152 | 153 | 131 | 134 | 142.50 | | 43.0111 | |

*Average of all high YBar values = 144.0° F.

After determining the total average based on the highest YBar value for all factors tested for both types of filler orientation, the total average response was determined for each filler type tested by adding the average valves for both parallel and perpendicular orientations, and dividing by the total number of orientations tested (i.e. (154.3+144.0)/2= 149.15° F. for flaked glass). Substantially lower total average response HDT values were obtained for Wollastonite (i.e. 141.4° F.) and milled glass (140.1° F.), respectively, supporting the proposition that flaked glass offers the best values in terms of HDT.

Additionally, as illustrated in Table IV, the results of physical testing for CLTE values using fractional factorial design experiment methods were also analyzed for the mean square deviation to determine the factors that most influenced the CLTE. In contrast to HDT values, it is advantageous to obtain the lowest value possible for the CLTE.

TABLE IV

CLTE, Milled Glass, parallel

| Factor | Level | 1 | 2 | 3 | 4 | YBar* | YBar Delta | S/N | S/N Delta |
|---|---|---|---|---|---|---|---|---|---|
| Density | 33–35 | 3.7 | 4.3 | 6.1 | 3.9 | 4.50 | 1.025 | −13.2531 | −2.3180 |
| | 38–41 | 4.2 | 3.6 | 2.6 | 3.5 | 3.48 | −10.9351 | | |
| Index | 100 | 3.7 | 4.2 | 6.1 | 2.6 | 4.15 | 0.325 | −12.7473 | −1.0661 |
| | 110 | 4.3 | 3.6 | 3.9 | 3.5 | 3.83 | | −11.6813 | |
| Filler | 15 | ?.7 | 4.2 | 4.3 | 3.6 | 3.95 | −0.075 | −11.8576 | 0.5606 |
| | 20 | 6.1 | 2.6 | 3.9 | 3.5 | 4.03 | | −12.5182 | |
| Mold Temp | 140–145 | 3.7 | 3.6 | 2.6 | 3.9 | 3.45 | −1.075 | −10.8475 | 2.4561 |
| | 160–165 | 4.2 | 4.3 | 6.1 | 3.5 | 4.53 | | −13.3036 | |

*Average of all low YBar value =3.68

CLTE, Milled Glass, perpendicular

| Factor | Level | 1 | 2 | 3 | 4 | YBar* | YBar Delta | S/N | S/N Delta |
|---|---|---|---|---|---|---|---|---|---|
| Density | 33–35 | 3.5 | 6.3 | 9.8 | 4.9 | 6.13 | 1.575 | −16.3344 | −2.7675 |
| | 38–41 | 5.4 | 2.1 | 5.6 | 5.1 | 4.55 | | −13.5669 | |
| Index | 100 | 3.6 | 5.4 | 9.8 | 5.6 | 6.08 | 1.475 | −16.2534 | −2.5372 |
| | 110 | 6.3 | 2.1 | 4.9 | 5.1 | 4.60 | | −13.7162 | |
| Filler | 15 | 3.5 | 5.4 | 6.3 | 2.1 | 4.33 | −2.025 | −13.2996 | 3.1699 |
| | 20 | 9.8 | 5.6 | 4.9 | 5.1 | 6.35 | | −16.4694 | |
| Mold Temp | 140–145 | 3.5 | 2.1 | 5.6 | 4.9 | 4.03 | −2.625 | −12.5545 | 4.2329 |
| | 160–165 | 5.4 | 6.3 | 9.8 | 5.1 | 6.65 | | −16.7875 | |

*Average of all low YBar values = 4.38

CLTE, Wollastonite, Parallel

| Factor | Level | 1 | 2 | 3 | 4 | YBar* | YBar Delta | S/N | S/N Delta |
|---|---|---|---|---|---|---|---|---|---|
| Density | 33–35 | 0.21 | 3.4 | 5.6 | 2.4 | 2.90 | 0.4525 | −10.8568 | −3.0142 |
| | 38–41 | 2.9 | 2.1 | 2.4 | 2.4 | 2.45 | | −7.8426 | |
| Index | 100 | 0.21 | 2.9 | 5.6 | 2.4 | 2.78 | 0.2025 | −10.5668 | −2.1954 |
| | 110 | 3.4 | 2.1 | 2.4 | 2.4 | 2.58 | | −8.3711 | |
| Filler | 15 | 0.21 | 2.9 | 3.4 | 2.1 | 2.15 | −1.0475 | −7.8576 | 2.9917 |
| | 20 | 5.6 | 2.4 | 2.4 | 2.4 | 3.20 | | −10.8493 | |
| Mold Temp | 140–145 | 0.21 | 2.1 | 2.4 | 2.4 | 1.78 | −1.7975 | −6.0136 | 5.5314 |
| | 160–165 | 2.9 | 3.4 | 5.6 | 2.4 | 3.58 | | −11.5450 | |

*Average of all low YBar values = 2.24

CLTE, Wollastonite, Perpendicular

| Factor | Level | 1 | 2 | 3 | 4 | YBar* | YBar Delta | S/N | S/N Delta |
|---|---|---|---|---|---|---|---|---|---|
| Density | 33–35 | 0.86 | 4.6 | 8 | −1.6 | 2.97 | −0.76 | −13.4468 | −1.8655 |
| | 38–41 | 4.8 | 3.5 | 2.8 | 3.8 | 3.73 | | −11.5814 | |
| Index | 100 | 0.86 | 0.48 | 8 | 2.8 | 3.04 | 0.46 | −12.6013 | −1.5967 |
| | 110 | 4.6 | 3.5 | −1.6 | 3.8 | 2.58 | | −11.0046 | |
| Filler | 15 | 0.86 | 4.8 | 4.6 | 3.5 | 3.44 | 0.19 | −11.5526 | 1.9129 |
| | 20 | 8 | 2.8 | −1.6 | 3.8 | 3.25 | | −13.4655 | |
| Mold Temp | 140–145 | 0.86 | 3.5 | 2.8 | −1.6 | 1.39 | −3.91 | −7.6696 | 7.1961 |
| | 160–154 | 4.8 | 4.6 | 8 | 3.8 | 5.30 | | −14.8657 | |

*Average of all low YBar values = 2.55

TABLE IV-continued

| Factor | Level | CLTE, Flake Glass, Parallel | | | | | | | |
|---|---|---|---|---|---|---|---|---|---|
| | | 1 | 2 | 3 | 4 | YBar* | YBar Delta | S/N | S/N Delta |
| Density | 33–35 | 1.4 | 3.2 | 1.7 | 1.2 | 1.88 | –0.525 | –6.1621 | 1.9132 |
| | 38–41 | 2.8 | 2.2 | 1.2 | 3.4 | 2.40 | | –8.0754 | |
| Index | 100 | 1.4 | 2.8 | 1.7 | 1.2 | 1.78 | –0.725 | –5.4808 | 2.9825 |
| | 110 | 3.2 | 2.2 | 1.2 | 3.4 | 2.50 | | –8.4634 | |
| Filler | 15 | 1.4 | 2.8 | 3.2 | 2.2 | 2.40 | 0.525 | –7.9379 | –1.5705 |
| | 20 | 1.7 | 1.2 | 1.2 | 3.4 | 1.88 | | –6.3674 | |
| Mold temp | 140–145 | 1.4 | 2.2 | 1.2 | 1.2 | 1.50 | –1.275 | –3.8382 | 5.2641 |
| | 160–165 | 2.8 | 3.2 | 1.7 | 3.4 | 2.78 | | –9.1022 | |

*Average of all low YBar values = 1.76

| Factor | Level | CLTE Flake Glass, Perpendicular | | | | | | | |
|---|---|---|---|---|---|---|---|---|---|
| | | 1 | 2 | 3 | 4 | YBar* | YBar Delta | S/N | S/N Delta |
| Density | 33–35 | 1.6 | 3.6 | 4 | 3.2 | 3.10 | 0.15 | –10.1870 | –0.2504 |
| | 38–41 | 3.1 | 2.4 | 1.7 | 4.6 | 2.95 | | –9.9366 | |
| Index | 100 | 1.6 | 3.1 | 4 | 1.7 | 2.60 | –0.85 | –8.9014 | 2.0781 |
| | 110 | 3.6 | 2.4 | 3.2 | 4.6 | 3.45 | | –10.9795 | |
| Filler | 15 | 1.6 | 3.1 | 3.6 | 2.4 | 2.68 | –0.7 | –8.8776 | 2.1166 |
| | 20 | 4 | 1.7 | 3.2 | 4.6 | 3.38 | | –10.9942 | |
| Mold Temp | 140–145 | 1.6 | 2.4 | 1.7 | 3.2 | 2.23 | –1.6 | –7.2937 | 4.4477 |
| | 160–165 | 3.1 | 3.6 | 4 | 4.6 | 3.83 | | –11.7413 | |

*Average of all low YBar values = 2.62

To determine the total average response for each filler type tested, the average for all YBar values for both types of filler orientation were added and divided by the total number of orientations tested. In this regard, the total average response for flaked glass was determined to be 2.19, whereas the total average response for wollastonite and milled glass were 2.40 and 4.03, respectively, thus supporting the proposition that flaked glass offers the best values in terms of CLTE. Preferably, the resulting molding will have a coefficient of linear thermal expansion of $4.0 \times 10^{-5}$ or less and more preferably, $3.5 \times 10^{-5}$ or less at the mold temperature. Additionally, it is preferred that the resulting molding formed in accordance with the teachings of the present invention will have an average specific gravity of about 0.8 g/cm$^3$ or less.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A process for producing a rigid cellular polyurethane reinforced reaction injection molding having a coefficient of linear thermal expansion of $4.0 \times 10^{-5}$ or less, comprising the steps of:
   a. providing
      (1) an isocyanate component comprising one or more polyisocyanates reacted with
      (2) a polyoxyalkylene polyether polyol composition comprising hydroxyl functional tertiary amine polyether polyols, a blowing agent, a polyurethane/isocyanate promoting catalyst and optionally a chain extender, a surfactant and a stabilizer;
   b. providing a filler component present in an amount of between about 10.0 weight percent to about 20.0 weight percent, based on the total weight of the composition, said filler component comprising at least 20 weight percent flaked glass based on the total amount of filler composition; and
   c. introducing said filler component b) into the polyol composition ii) prior to reaction with isocyanate i).

2. The process of claim 1, wherein said hydroxyl functional tertiary amine polyether polyols are terminated with primary hydroxyl groups.

3. The process of claim 1, wherein said hydroxyl functional tertiary amine polyether polyols are selected from the group consisting of monoalkanolamine-initiated polyols, alkylenediamine-initiated polyols, and mixtures thereof.

4. The process of claim 3, wherein said hydroxyl functional tertiary amine polyether polyols are selected from the group consisting of monoethanolamine-initiated polyols, ethylenediamine-initiated polyols, and mixtures thereof.

5. The process of claim 1, wherein said hydroxyl functional tertiary amine polyether polyol has an average functionality of between about 2.5 to 6.

6. The process of claim 1, wherein said filler component further comprises wollastonite fibers.

7. The process of claim 5, wherein the wollastonite fibers have an aspect ratio of 10 or greater, and are from about 0.03 inches to about 0.25 inches in length.

8. The process of claim 1, wherein said flaked glass has an average diameter of between about 1/64 of an inch to about 1/8 of an inch.

9. The process of claim 7, wherein said flaked glass is coated with a composition selected from the group consisting of aminoalkyl, chloro, epoxy, vinyl and/or isocyanate compiling agents, latex and titonate, and mixtures thereof.

* * * * *